United States Patent [19]
Kobayashi

[11] Patent Number: 5,713,977
[45] Date of Patent: Feb. 3, 1998

[54] FIXED BED FILTERING PREHEATER PROCESS FOR HIGH TEMPERATURE PROCESS FURNACES

[75] Inventor: Hisashi Kobayashi, Putnam Valley, N.Y.

[73] Assignee: Praxair Technology, Inc., Danbury, Conn.

[21] Appl. No.: 302,969

[22] Filed: Sep. 12, 1994

[51] Int. Cl.⁶ ................................................. C03B 3/02
[52] U.S. Cl. .................... 65/134.6; 65/134.4; 65/136.1; 65/136.2; 65/335
[58] Field of Search .................. 65/136.1, 136.2, 65/135.9, 27, 335, 337, 347, 355, 356, 482, 134.4, 134.6; 110/216; 266/144, 145, 157, 148, 151, 175; 432/14, 16, 67, 69, 179, 180, 197; 95/274, 275

[56] References Cited

U.S. PATENT DOCUMENTS

| | | | |
|---|---|---|---|
| 3,953,190 | 4/1976 | Lange | 65/335 |
| 4,061,487 | 12/1977 | Kiyonaga | 65/135 |
| 4,074,990 | 2/1978 | Brzozowski et al. | 65/136.1 |
| 4,185,984 | 1/1980 | Kiyonaga | 65/135 |
| 4,248,616 | 2/1981 | Seng et al. | 65/27 |
| 4,349,367 | 9/1982 | Krumwiede | 65/136.1 |
| 4,473,388 | 9/1984 | Lauwers | 65/134 |
| 4,539,030 | 9/1985 | Demarest et al. | 65/136.1 |
| 4,582,521 | 4/1986 | Froberg | 65/136.1 |
| 4,652,289 | 3/1987 | Drouet et al. | 65/335 |
| 4,797,092 | 1/1989 | Pieper | 432/95 |
| 4,875,919 | 10/1989 | DeSaro et al. | 65/136.1 |
| 4,973,346 | 11/1990 | Kobayashi | 65/135 |
| 5,076,779 | 12/1991 | Kobayashi | 431/5 |
| 5,147,438 | 9/1992 | Castelain et al. | 65/135 |
| 5,267,850 | 12/1993 | Kobayashi et al. | 431/8 |
| 5,290,334 | 3/1994 | Alexander | 65/335 |

FOREIGN PATENT DOCUMENTS

| | | | |
|---|---|---|---|
| 830407 | 12/1969 | Canada | 65/136.1 |
| 106458 | 5/1967 | Denmark | 65/136.1 |
| 56-007625 | 1/1981 | Japan | 95/274 |
| 57-075119 | 5/1982 | Japan | 95/274 |
| 909806 | 11/1962 | United Kingdom | 65/136.1 |

Primary Examiner—William H. Beisner
Attorney, Agent, or Firm—Stanley Ktorides

[57] ABSTRACT

A glassmelting or particle heating system wherein hot flue gas is radiatively cooled in a gas cooling zone integrated within a preheating vessel and a fixed or non-moving bed of material is formed in a filtering zone of the preheating vessel for traverse by flue gas effecting heat transfer, filtering, and, if present, condensation of volatile condensibles.

7 Claims, 3 Drawing Sheets

FIXED BED FILTERING PREHEATER PROCESS FOR HIGH TEMPERATURE PROCESS FURNACES

TECHNICAL FIELD

This invention relates generally to the field of high temperature furnaces and is particularly applicable to glassmaking wherein glass forming materials are melted.

BACKGROUND ART

A conventional glassmelting furnace employs air-fired burners to melt the glass forming materials. Because of the very high temperatures required to melt the glass forming materials, a glassmelting furnace operates at temperatures which are among the highest of all industrial furnaces. These high operating temperatures cause a large amount of the heat produced by the burners to be lost up the flue. Typically only about 15 to 20 percent of the energy produced by the burners is available to the glassmelting furnace as useful heat when the burners are fired with ambient air and natural gas.

Those skilled in the art have addressed this problem by passing the flue gases from the glassmelting furnace in indirect heat exchange with incoming air to preheat the air and thus transfer heat, which otherwise would have escaped up the flue, back to the glassmelting furnace. These heat exchangers, known in the art are regenerators, significantly raise the efficiency of commercial air-fired glassmelting furnaces.

Nitrogen oxides, known as $NO_x$, are considered to be detrimental environmental pollutants and the reduction of $NO_x$ emissions is an increasingly important goal. The conventional air-fired glassmelting process is a significant generator of $NO_x$ for two reasons. First, nearly 80 percent of air is nitrogen thus bringing significant amounts of nitrogen into the combustion process for the formation of $NO_x$. Second, the high temperatures required for the glassmelting operation kinetically favor the formation of $NO_x$.

It is known that the thermal efficiency of the glassmelting step can be increased by the use of oxygen or oxygen-enriched air as the oxidant. Moreover, the use of oxygen or oxygen-enriched air reduces the amount of nitrogen which is present in the combustion zone on an equivalent oxygen molecule basis. However, the cost of oxygen often makes glassmelting using oxygen as the oxidant more expensive than a conventional system using air as the oxidant, despite the increased thermal efficiency attainable with oxygen.

A recent significant advancement in the field of glassmelting is the method disclosed and claimed in U.S. Pat. No. 4,973,346—Kobayashi wherein glassforming materials are preheated prior to entering the melting vessel.

While preheating of cullet, i.e. recycled waste glass, has recently been successfully adopted in commercial air fired glass furnace applications, preheating of raw batch materials has encountered several difficulties which have limited its commercial success. One problem is the tendency of some of the glassforming materials to agglomerate or sinter in the preheater thus preventing the smooth flow of preheated glassforming materials even at temperatures below 1000° F. Another problem is carryover of fine raw materials into the flue gas which causes a high concentration of dust in the flue gas which has required an expensive investment in pollution control equipment on the exhaust gas line.

In a glass melting furnace using oxygen or oxygen enriched air, high flue gas temperature presents an additional technical difficulty. The state-of-the-art cullet and batch preheaters are designed to handle cooler flue gas from air fired furnaces after a recuperator or regenerators. Typically the maximum inlet temperature of flue gas is less than 1500° F. High temperature flue gas has to be cooled by dilution with cooling air or by a heat exchanger. This tends to reduce the overall thermal efficiency and adds to the complexity of the system.

Accordingly, it is desirable to have an improved process which will overcome problems which preheaters have heretofore encountered, and thus it is an object of this invention to provide a system with an efficient preheater which will provide a significantly lower level of pollutants in the exhaust.

SUMMARY OF THE INVENTION

The above and other objects which will become apparent to one skilled in the art upon a reading of this disclosure are attained by the present invention, one aspect of which is:

A method for preheating glassmaking particles comprising:

(A) generating hot flue gas in a glassmelting zone, said hot flue gas containing particulate matter and condensable volatile matter;

(B) passing hot flue gas from the glassmelting zone into a preheating vessel comprising a gas cooling zone and a filtering zone;

(C) providing cold glassmaking particles into the preheating vessel and forming a bed of glassmaking particles in the filtering zone;

(D) passing hot flue gas through the cooling zone while reducing the temperature of the flue gas by at least 200° F. by radiation of heat to glassmaking particles;

(E) passing resulting flue gas from the cooling zone through the bed of glassmaking particles while maintaining the bed fixed, heating the bed while filtering particulate matter from the flue gas to the bed, and condensing volatile matter from the flue gas onto the glassmaking particles; and (F) passing heated glassmaking particles from the preheating vessel to the glassmelting zone, and removing cleaned flue gas from the preheating vessel.

Another aspect of the invention comprises:

A glassmelting apparatus comprising (A) a glassmelting vessel;

(B) a preheating vessel comprising a cooling zone and a filtering zone;

(C) means for providing glassmaking particles into the preheating vessel and means for forming a fixed bed of glassmaking particles in the filtering zone of the preheating vessel;

(D) means for passing flue gas from the glassmelting vessel into the cooling zone of the preheating vessel, through the bed of glassmaking particles in the filtering zone, and out from the preheating vessel; and (E) means for passing glassmaking particles from the preheating vessel into the glassmelting vessel.

As used herein the term "condensable volatile matter" means matter which may be in the gaseous state in a glassmelting vessel and in a liquid or solid state in a preheating vessel.

As used herein, the term "hot flue gas" means flue gas at a temperature generally exceeding 1500° F. and, when condensable volatile matter is present, at a temperature sufficiently high to maintain at least some condensable volatile matter in the gaseous state.

As used herein, the term "cold glassforming particles" means glassforming particles at a temperature sufficiently low to maintain at least some condensable volatile matter in the liquid or solid state.

As used herein, the term "bed" means a permeable aggregate of solid particles held within a vessel.

As used herein, the terms "fixed bed" and "non-moving bed" mean a bed comprised of non-flowing particles.

DETAILED DESCRIPTION

The invention will be described in detail with reference to the Drawings.

Figure 1:
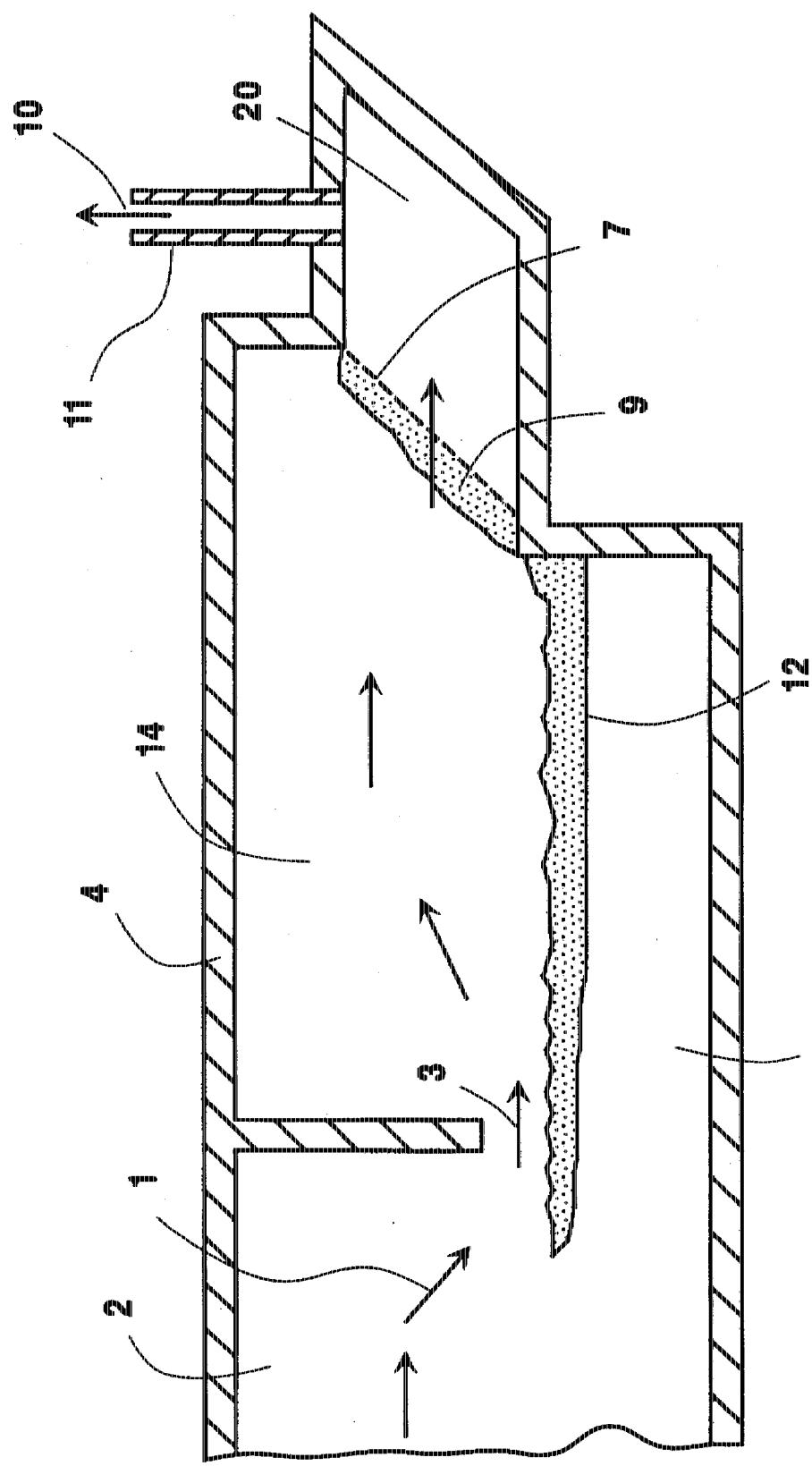
FIG. 1 is a simplified cross-sectional representation of one embodiment of the system of the invention.
Figure 2:
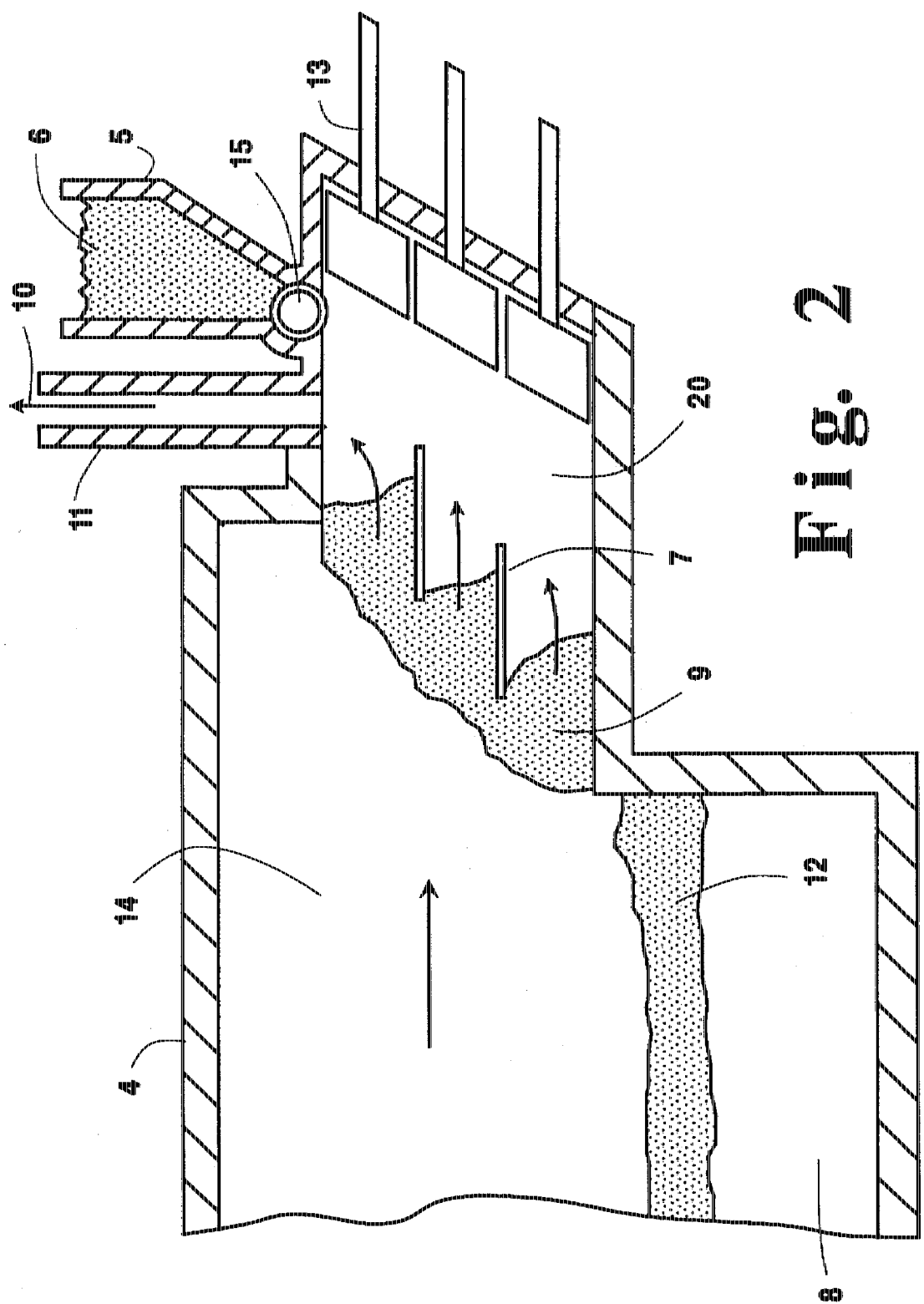
FIG. 2 is a more detailed representation of certain aspects of the invention.

Referring now to FIGS. 1 and 2, hot flue gas 1 is generated in glassmelting vessel or zone 2. Zone 2 may also be a furnace zone. The numerals in FIGS. 1 and 2 are the same for the common elements. The hot flue gas is generated in part by the combustion of fuel, such as natural gas, with oxygen-enriched air having an oxygen concentration of 30 percent or more, or with technically pure oxygen having an oxygen concentration exceeding 99.5 percent. The use of oxygen or oxygen-enriched air reduces the nitrogen ballast which would otherwise be present if air were the oxidant, thus reducing the volume of the flue gas and effectively enabling the downstream through-bed flow which will be described below with reference to the preheater and which enables the attainment of the advantageous results of the invention. The combustion is carried out by means of a burner which is not shown in the Figures. Preferred burners are those disclosed in U.S. Pat. No. 5,076,779—Kobayashi and U.S. Pat. No. 5,267,850—Kobayashi et al. The thus generated hot flue gas provides heat to the glassmelting zone to heat and melt the glassforming materials. Typically, the temperature of the hot flue gas will exceed about 2400° F. and will generally be within the range of from 2000° F. to 3000° F. The hot flue gas will comprise nitrogen and products of combustion such as carbon dioxide and water vapor.

In the course of heating the glassforming materials in the glassmelting zone, the hot flue gas will pick up particulate matter and condensable volatile matter from the glassforming materials. Examples of such particulate matter include small particulates in the glass feed materials and examples of such condensable volatile material include sodium sulfate, sodium hydroxide and sodium metaborate.

Figure 3:
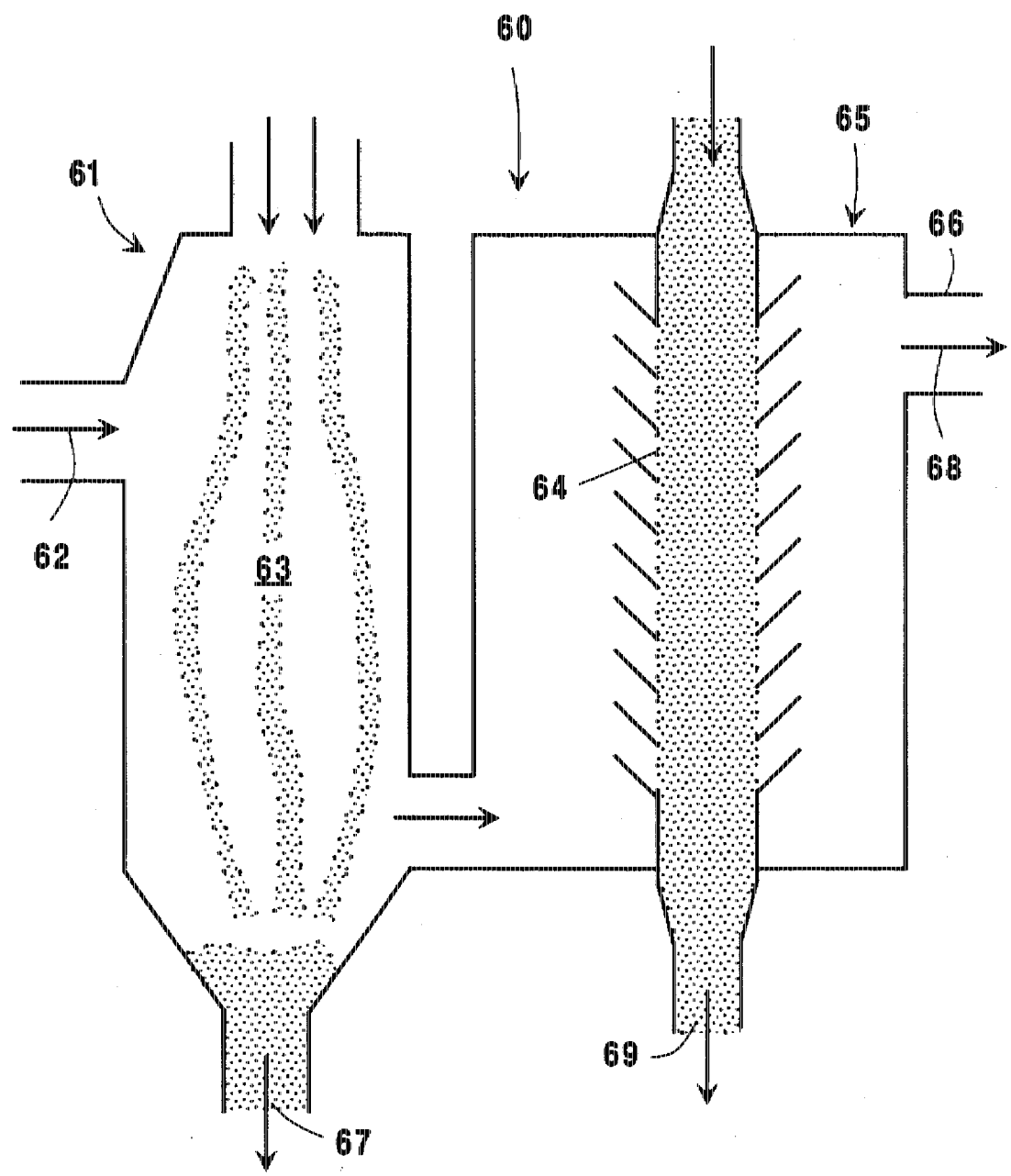
FIG. 3 is a representation of a preheater for use with the invention employing a gas cooling zone using flowing batch materials.

The hot flue gas containing the particulate matter and the volatile matter is passed from glassmelting zone 2 through passage means 3 into preheating vessel or chamber 4 comprising gas cooling zone 14 and filtering zone 20. Passage means 3 has a small cross sectional area to minimize radiation heat transfer, but must be sufficiently large to keep the pressure drop to less than one inch of water. In the preferred embodiment illustrated in FIG. 2, preheating vessel 4 is integrated with a conventional glassmelting furnace and forms a separate zone of the furnace with a common glass bath. As illustrated in FIG. 3, preheating vessel 4 may also be physically separated from a glass furnace and connected by a flue gas duct. Also provided into preheating vessel 4 through feed means 5 are cold glassforming particles 6. The glassforming or glassmaking materials will typically include one or more materials such as sand, soda ash, limestone, dolomite, rouge and cullet or scrap glass. The cold glassforming materials will generally be fed at ambient temperature.

The cold glassmaking materials are formed generally into two or more beds 9 within preheating vessel 4 such as on support means 7. Multiple beds that can be charged and discharged independently may be arranged vertically as illustrated in FIG. 2 or horizontally. Bed 9 may form a part of the demarcation between the cooling zone and the filtering zone as illustrated in FIG. 1 and may also form side walls to provide a large surface area exposed to hot flue gas. In the embodiment illustrated in FIG. 2, the bed 9 is formed onto horizontal supports 7 by passing particles 6 through rotary valve 15 and pushing particles 6 onto horizontal supports 7 by means of feed push devices 13. The hot flue gas is caused to flow into cooling zone 14 and from there through bed 9 such as by means of an induced draft fan or an eductor. FIGS. 1 and 2 illustrate a preferred arrangement wherein the bed surface is at an angle to the flow of gas through the bed. The angled bed arrangement with an open surface formed by the bed materials provides a unique advantage in that metallic supports 7 and push device 13 are protected from hot flue gas by beds 9. The angle of the bed is kept close to the normal angle of repose of the charge materials to produce a uniform bed thickness. A mechanical vibration means may be used to facilitate a smooth flow of bed materials to form a uniform thickness. The bed thickness is selected to achieve a good filtration efficiency without excessive pressure drop. As the hot flue gas flows through vessel 4, a number of advantageous effects happen. With the hot flue gas in cooling zone 14, heat from the hot flue gas is transferred by radiation to the glassforming material and to the vessel walls thus preheating the glassforming material and improving the thermal efficiency of the glassmelting process. The radiative heat transfer is to the cold particles forming bed 9 and may also be to the heated particles 12 floating upon molten glass bath 8. In order to achieve efficient radiative heat transfer from the hot flue gases to the glass forming materials, it is important to have a large open gas space, large bed surface areas and well insulated walls. This radiative heat transfer reduces the temperature of the flue gas by at least 200° F., preferably by at least 500° F., and generally to a temperature less than 1500° F. The reduced temperature flue gas is then passed through the bed. As the flue gas passes through the bed, particulate matter is filtered out from the flue gas onto the bed as the bed is further heated by convective and conductive heat transfer from the flue gas. Simultaneously, condensable volatile matter is caused to condense out from the flue gas onto the bed. Some of the bed particles may agglomerize or sinter which may be advantageous by improving the filtering activity of the bed. When a bed is heated to a desired temperature, flue gas flow to the bed is stopped by closing the flue gas passage downstream of the bed (not shown), while continuously passing flue gas through other beds. The preheated bed is replaced with fresh glass forming materials by means of charge device 13. A back purge flow may be used during charging to prevent entrainment of dust into the down stream passage of the bed.

As a result of the heat transfer, condensation and filtering, three independent beneficial effects are carried out simply, simultaneously and efficiently. Cooled flue gas 10, cleaned of both particulate matter and condensable volatile matter, is passed out of preheating vessel 4 through exhaust means 11.

Preheated glassforming particles 12 are passed, such as through passage 3, into glassmelting zone 2. The heat from the flue gas is effectively used to preheat the particles.

The invention differs from conventional preheating systems which are used in conjunction with furnaces such as glassmelters in that the bed of particles is a fixed or non-moving bed during the heating phase. With a conventional moving bed system, the motion of the bed particles serves to release the captured particulate and condensed materials. Thus, even though some particulate matter within the flue gas may be removed, particulate matter re-released by the moving bed escapes into the flue duct.

Another problem experienced by the glassmaking industry is the softening or partial melting of glassforming materials in a preheater due to direct contact of glassforming particles with hot flue gas. This softening or partial melting may cause severe materials handling difficulties. This problem is overcome by the invention wherein the hot flue gas is first cooled by radiative heat transfer in the gas cooling zone which is integrated with the filtering zone within the preheating vessel to, for example, a temperature less than 1500° F. before directly contacting the bed of particles in the filtering zone. Furthermore, the specific bed design illustrated in FIG. 2 enables a certain degree of melting at the bed surface.

The system of this invention operates especially well due to the low volumetric flowrate of the flue gas resulting from the use of technically pure oxygen or oxygen-enriched air as the oxidant for the combustion which generates the flue gas. Typically, the flue gas flowrate in the practice of the invention is three to five times lower than in an otherwise comparable conventional glassmelting system.

It is preferred that the average particle size of the glassforming materials making up the bed be within the range of from 0.1 to 5 millimeters. While a smaller average particle size will improve the filtering and heat transfer characteristics of the process, the resulting high pressure drop across the bed may make the process uneconomical to carry out.

Since some of the glass forming materials have better physical characteristics as filtering medium, selected constituents of glass forming materials may be used in the filter bed. For example, raw batch materials are generally prepared to less than 1 mm in size. Cullet may be crushed and sized to 1 to 5 mm in size and used for the beds, hence reducing the pressure drop. Sand used in the raw batch materials typically constitutes about 60 to 70 percent by weight and possesses excellent solid flow characteristics and temperature stability. Sand may be used as the only filtering medium and preheated sand may be mixed with other glassmaking materials prior to charging to a glass melting furnace.

The preheating vessel may also be designed so as to maximize heat transfer from the hot flue gas to the walls of the preheating vessel, thus improving the heat transfer to the cold glassforming materials. A cyclic multiple bed system with mechanical charge devices is preferred as it may experience fewer technical operating difficulties than a continuous moving bed system. The integrated preheater design and direct charging of preheated glass forming materials over the molten glass illustrated in FIG. 1 has a further advantage in that virtually no heat is lost during the normal material transfer period from a preheating vessel to a glass melting furnace.

In the embodiment illustrated in FIG. 3 preheating vessel 60 has cooling zone 61 and filtering zone 65. In cooling zone 61, hot flue gas 62 flows through a shower of cold particles 63 effecting radiative heat transfer with enhanced convective heat transfer. Condensable volatile material may condense out of the flue gas onto the particles 63. Particles such as glassforming materials form vertical or suspension fixed bed 64 within filtering zone 65 through which the flue gas passes. Cleaned flue gas 68 is removed from preheating vessel 60 through exhaust 66 and preheated materials 67 and 69 are passed onto the glassmelter or furnace. Glass forming materials 67 and 69 may be selected from one or more constituents of the overall composition and mixed together prior to or during feeding into a glass melting furnace. For example, only sand may be used as particles 63 and only cullet may be used as fixed bed medium 64. Although not illustrated in FIG. 3, two or more fixed beds 64 and cyclic operation is required to continuously process flue gas.

The following calculated example is provided for illustrative purposes and is not intended to be limiting. Employing a three bed cyclic system each system similar to that illustrated in FIGS. 1 and 2, cold glassforming materials comprising typical soda-lime glass batch with a 35 percent cullet ratio are used to form beds having an area of 80 square feet and an average depth of six inches. The glassforming materials have an average particle size of 0.5 millimeter. Hot flue gas generated by the combustion of technically pure oxygen with natural gas at a rate of 8.6 Million BTU/hr., having a temperature of 2870° F. and comprising particulate matter and sodium sulfate, is passed through the cooling zone wherein it is cooled by radiation to a temperature of about 1000° F. Thereafter the gas is passed through the bed at an average gas velocity of 0.17 feet/second experiencing a pressure drop of 8.5 inches of water. The bed particles are preheated to an average temperature of 900° F. while the surface of the particle bed has a temperature of about 1000° F. The clean flue gas has a temperature of 500° F. and is compared with incoming hot flue gas. The comparison indicates 99 percent of the particulate matter and virtually all of the sodium sulfate has been removed by passage through the bed.

The invention may be extended to other high temperature furnaces such as cement kilns, lime kilns or furnaces which process iron ore or any pelletized materials. In such applications, the invention would operate in the same way as in conjunction with glassmelting except that condensable volatile material may not be present. A rigorous definition of such a method would be as follows:

A method for preheating particles comprising (A) generating hot flue gas in a furnace zone, said hot flue gas containing particulate matter;

(B) passing hot flue gas from the furnace zone into a preheating vessel comprising a gas cooling zone and a filtering zone;

(C) providing cold particles into the preheating vessel and forming a bed of particles in the filtering zone;

(D) passing hot flue gas through the cooling zone while reducing the temperature of the flue gas by at least 200° F. by radiation of heat to the particles;

(E) passing resulting flue gas from the cooling zone through the bed of particles while maintaining the bed fixed and heating the bed while filtering particulate matter from the flue gas to the bed; and (F) passing heated particles from the preheating vessel to the furnace zone and removing cleaned flue gas from the preheating vessel.

Although the invention has been described in detail with reference to certain embodiments, those skilled in the art will recognize that there are other embodiments of the invention within the spirit and scope of the claims.

I claim:

1. A method for preheating glassmaking particles comprising:
   (A) generating hot flue gas in a glassmelting zone, said hot flue gas containing particulate matter and condensable volatile matter;
   (B) passing the hot flue gas from the glassmelting zone into a preheating vessel comprising a gas cooling zone and a filtering zone, said cooling zone containing molten glass and heated glassmaking particles floating upon the molten glass;
   (C) providing cold glassmaking particles into the preheating vessel and forming a bed of said cold glassmaking particles in the filtering zone;
   (D) passing the hot flue gas through the cooling zone while reducing the temperature of the flue gas by at least 200° F. by radiation of heat;
   (E) passing resulting flue gas from the cooling zone through the bed of glassmaking particles while maintaining the bed fixed, heating the bed by said passage of flue gas through the bed while filtering particulate matter from the flue gas to the bed and condensing volatile matter from the flue gas onto the bed to produce cleaned flue gas and said heated glassmaking particles; and
   (F) passing the heated glassmaking particles from the preheating vessel to the glassmelting zone, and removing cleaned flue gas from the preheating vessel.

2. The method of claim 1 wherein the hot flue gas is generated at least in part by the combustion of fuel with oxidant having an oxygen concentration of at least 30 percent oxygen.

3. The method of claim 1 wherein the bed of glassmaking particles in the filtering zone consists essentially of sand, further comprising passing resulting heated sand along with other glassmaking materials to the glassmelting zone.

4. The method of claim 1 wherein the preheating vessel forms a zone within the glassmelting zone with a common glass bath.

5. The method of claim 1 wherein at least a portion of the radiation of heat is to the bed.

6. The method of claim 1 wherein the temperature of the hot flue gas is within the range of from 2000° F. to 3000° F.

7. The method of claim 1 wherein the glassmaking particles comprise cullet.

* * * * *